J. R. WILLARD.
SEAT.
APPLICATION FILED SEPT. 6, 1911.
1,041,213.
Patented Oct. 15, 1912.
2 SHEETS—SHEET 1.
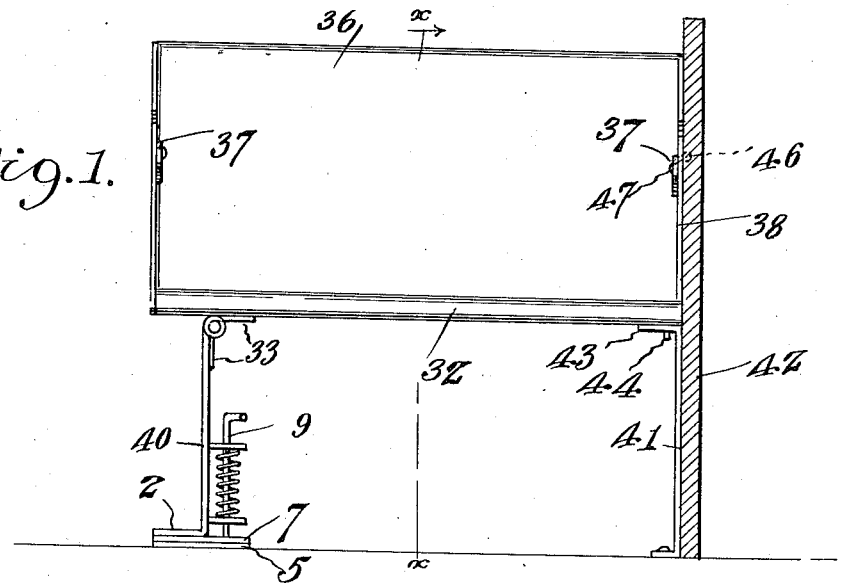
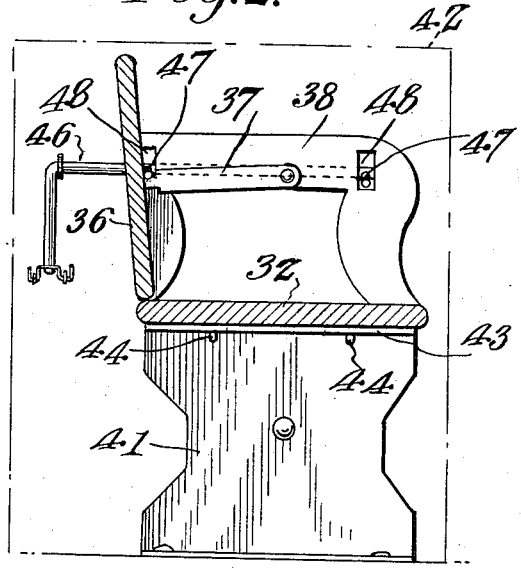
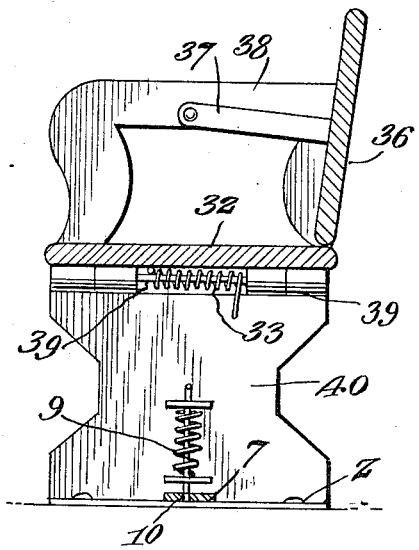
WITNESSES:
INVENTOR
James R. Willard
BY
Attorney J. R. WILLARD.
SEAT.
APPLICATION FILED SEPT. 6, 1911.
1,041,213.
Patented Oct. 15, 1912.
2 SHEETS—SHEET 2.
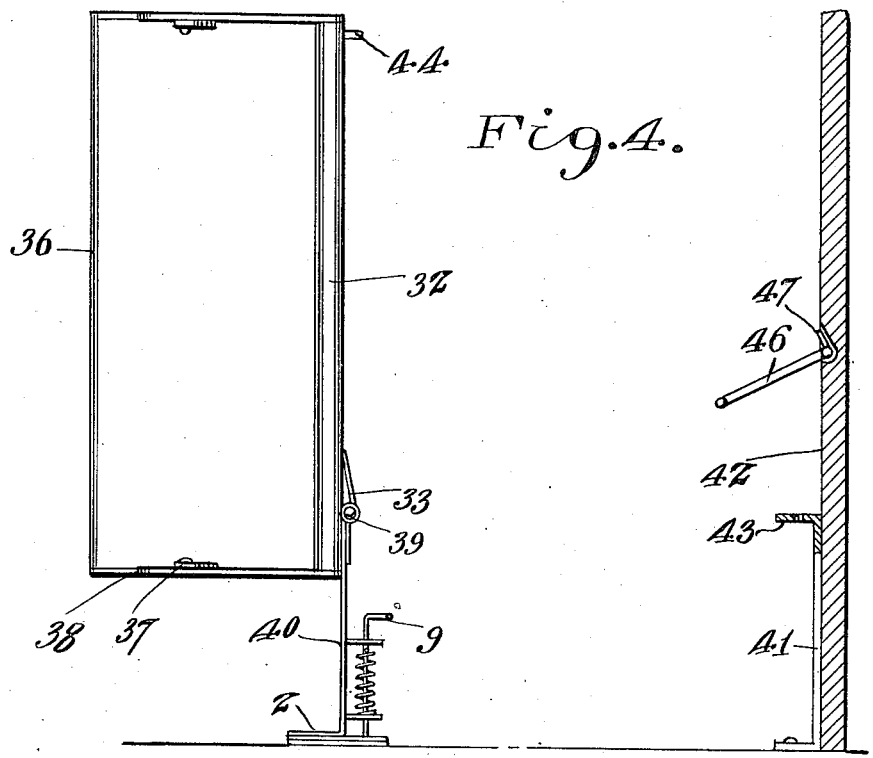
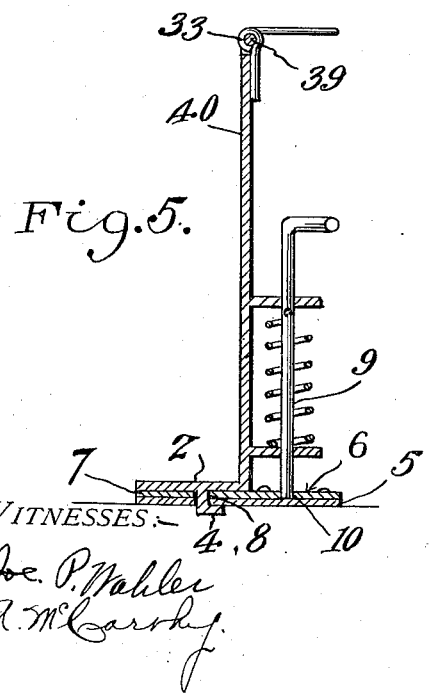
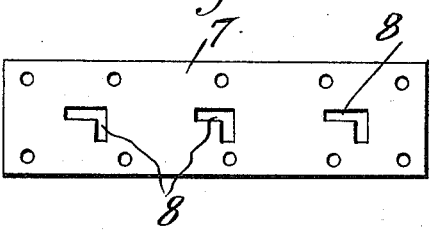
WITNESSES:
INVENTOR
James R. Willard
BY
Attorney

UNITED STATES PATENT OFFICE.

JAMES R. WILLARD, OF IAEGER, WEST VIRGINIA.

SEAT.

1,041,213.  Specification of Letters Patent.  Patented Oct. 15, 1912.

Application filed September 6, 1911. Serial No. 647,804.

*To all whom it may concern:*

Be it known that I, JAMES R. WILLARD, a citizen of the United States, and residing at Iaeger, in the county of McDowell and State of West Virginia, have invented certain new and useful Improvements in Seats, of which the following is a specification.

This invention relates to improvements in seats or settees.

The primary object of the invention is to provide a seat which may be readily raised or removed from one of its supporting brackets or legs.

Another object is to provide a seat which, together with its supporting brackets or legs may be readily secured in position or displaced.

A further object is to provide a seat, one end of which may be raised and suitably secured in such raised position.

A still further object is to provide a hingedly secured seat, one of the supporting legs or brackets of which may be readily removed from the floor or other support.

A still further object is to provide a seat, the supporting brackets or legs of which may be readily folded and placed adjacent to the seat, permitting the same to be compactly folded when not in use or for storing, or while being shipped.

With these and other objects in view, the invention consists in the combination and arrangement of parts as will be hereinafter more fully described and defined by the appended claim, it being understood that changes in the specific structure shown and described may be made within the scope of the claim without departing from the spirit of the invention.

In the accompanying drawings illustrating the preferred embodiment of my invention;—Figure 1, is a front view thereof. Fig. 2, is a vertical transverse section on line x—x of Fig. 1, looking in the direction of the arrows. Fig. 3, is a similar view as Fig. 2, but looking in the opposite direction. Fig. 4, is a view in elevation of the invention, showing the seat raised or elevated at one end. Fig. 5, is an enlarged detailed view of a seat supporting bracket or leg. Fig. 6, is a like view of a leg retaining base plate.

The primary aim of my invention is to provide a seat or settee especially arranged for use in halls, cars, cabins, boats and cabs, the same being so constructed that one end of the seat may be raised or elevated, permitting the displacement of the leg or supporting bracket for that end, the entire seat with its legs or supporting brackets being removably secured to its retaining base-plates.

In the accompanying drawings the numeral 5, designates the floor or surface to which the seat supporting legs are secured. This floor or surface is provided with a plurality of L-shaped key-slots, 6, and in order to prevent undue wear of the floor, I provide wear or floor plates, 7, as shown in Fig. 6, these plates also having L-shaped key-slots, 8.

A seat proper, 32, of any approved construction, and having connected thereto a reversible back, 36, by means of links, 37, pivoted to said back, and to the arms 38, of said seat, is hinged or pivoted as at 39, upon its underside, near one end, to a supporting bracket or leg member, 40, to allow of raising or elevating that end, of said seat as indicated in Fig. 4. It will be noted that the hinging or pivoting point, 39, is so arranged as to allow that end of the seat-bottom, as the seat is elevated, to suitably engage or fit against the supporting bracket or leg and thus serve as a stop to requisitely limit the tilting or elevating movement of the seat.

The supporting bracket or leg member, 40, has at its lower end a right-angled outturned portion or flange, 2, which is equipped upon its underside preferably with L-shaped retaining or key-lugs, 4, engaging or taking into the corresponding bayonet-joint slots, 6, in the floor, the lugs first passing through or being received by the registering slots, 8, in the floor or wear plate, 7, to provide for the ready detachment or displacement of the supporting bracket or leg when this may be required. A spring-equipped pin or bolt, 9, is suitably applied or arranged in connection with the supporting bracket or leg-member, 40, for engagement with an aperture or socket, 10, in the wear or base-plate, 7, for aiding the retention of said bracket or leg-member in effective position and yet allow of the removal of the latter when required. In order to aid raising or elevating the seat, a coiled or other suitable form of spring, 33, may be, or is applied to the hinging pivot of the hinge, 39, of the seat, so as to exert its tension or pressure upon the latter.

The seat, 32, is supported at its opposite end upon a like bracket or leg-member, 41, suitably secured in position, say to the side or wall, 42, of the car, or inclosure, said bracket or leg-member having an upper and inwardly-extending flange, 43, upon which said end of the seat rests. Said seat-end is provided upon its underside with downwardly projecting pins or studs, 44, adapted to engage, or be received by apertures, 45, produced in the flange, 43, for the retention of the seat, at that end, as against any casual displacement.

A suitably handled rod-member or lever, 46, is suitably hung or pivoted in the wall or side of the inclosure, 42, and provided with preferably outstanding lugs, 47, adapted to be received by slots, 48, in the arms, 38, of the seat, and to engage the inner surface of said arms and incidentally one of the seat-back links 37, after passage through said slots, for effectively retaining that end of the seat in position.

A seat constructed according to my invention is simple and inexpensive, and is both durable and efficient in operation, and the seat as well as the bracket adjustments can be made with ease, accuracy and despatch.

Having thus described my said invention, what I claim as new and desire to secure by United States Letters Patent, is:—

In a device of the character described, the combination of a hinged seat, supporting means including a flange upon which the free end of the seat is adapted to rest loosely when the seat is in normal position, a rock shaft mounted upon the supporting means, and a lateral arm upon the shaft for engaging the swinging end of the seat to hold it in position upon the said flange.

In testimony whereof I affix my signature in presence of two witnesses.

JAMES R. WILLARD.

Witnesses:
J. R. AUVILLE,
D. L. AUVIL.